(12) United States Patent
Mannweiler et al.

(10) Patent No.: US 11,497,077 B2
(45) Date of Patent: Nov. 8, 2022

(54) METHOD AND APPARATUS FOR PORT MANAGEMENT OF ETHERNET BRIDGES

(71) Applicant: Nokia Technologies Oy, Espoo (FI)

(72) Inventors: Christian Mannweiler, Munich (DE); Peter Rost, Heidelberg (DE); Borislava Gajic, Unterhaching (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/864,544

(22) Filed: May 1, 2020

(65) Prior Publication Data

US 2020/0351973 A1 Nov. 5, 2020

Related U.S. Application Data

(60) Provisional application No. 62/842,927, filed on May 3, 2019.

(51) Int. Cl.
*H04W 76/25* (2018.01)
*H04W 80/06* (2009.01)
*H04W 88/06* (2009.01)
*H04W 88/18* (2009.01)
(Continued)

(52) U.S. Cl.
CPC ......... *H04W 76/25* (2018.02); *H04W 76/12* (2018.02); *H04W 76/30* (2018.02); *H04W 80/06* (2013.01); *H04W 88/06* (2013.01); *H04W 88/18* (2013.01)

(58) Field of Classification Search
CPC ............... H04W 76/00–40; H04W 88/08–188
See application file for complete search history.

(56) References Cited

U.S. PATENT DOCUMENTS

| 2004/0190454 A1* | 9/2004 | Higasiyama ............ H04L 45/04 370/238 |
| 2010/0232356 A1 | 9/2010 | Maheshwari et al. |
| 2017/0111219 A1* | 4/2017 | Saltsidis ............ H04L 41/0813 |

(Continued)

FOREIGN PATENT DOCUMENTS

| WO | WO 2018/204806 A1 | 11/2018 |
| WO | WO 2019/033958 A1 | 2/2019 |
| WO | WO 2019/166081 A1 | 9/2019 |

OTHER PUBLICATIONS

Decker, E. et al., *Definitions of Managed Objects for Bridges*, RFC 1493 (1993) 34 pages, Best Available Date: Jul. 1993.

(Continued)

*Primary Examiner* — San Htun
(74) *Attorney, Agent, or Firm* — Alston & Bird LLP

(57) ABSTRACT

Methods, systems, apparatuses, and computer program products for transparent integration of a wireless network (e.g., a 3$^{rd}$ Generation Partnership Project (3GPP) network) into a wireline network (e.g., a time sensitive networking (TSN) network) are provided. A method, system, and apparatus may receive, at a networking translator, a notification trigger related to a protocol data unit session from a networking translator client or a network function of a communication network. The method, system, and apparatus may cause transmission, at the networking translator, of notification information to a network controller of the communication network according to an interface.

16 Claims, 9 Drawing Sheets

(51) Int. Cl.
*H04W 76/12* (2018.01)
*H04W 76/30* (2018.01)

(56) References Cited

U.S. PATENT DOCUMENTS

| | | | | |
|---|---|---|---|---|
| 2018/0063020 | A1* | 3/2018 | Bhagavatula | H04L 47/783 |
| 2018/0124482 | A1 | 5/2018 | Bottari et al. | |
| 2018/0227743 | A1* | 8/2018 | Faccin | H04L 65/1069 |
| 2019/0306068 | A1* | 10/2019 | Kiss | H04W 60/00 |
| 2020/0137615 | A1* | 4/2020 | Joseph | H04W 56/001 |
| 2020/0267785 | A1* | 8/2020 | Talebi Fard | H04W 76/12 |

OTHER PUBLICATIONS

McCloghrie, K. et al., *Textual Conventions for SMIv2*, RFC 2579 (Apr. 1999) 26 pages.

McCloghrie, K. et al., *The Interfaces Group MIB*, RFC 2863 (Jun. 2000) 69 pages.

Principle of 5G Bridge Port Configuration, 3GPP TSG-SA WG2 Meeting #132, S2-1903365 (Apr. 2019) 2 pages, Best Available Date: Apr. 8-Dec. 2019.

5G Bridge Granularity, 3GPP TSG-SA WG2 Meeting #312, S2-1903364 (Apr. 2019) 6 pages, Best Available Date: Apr. 8-Dec. 2019.

3GPP TS 23.501 V16.0.2, $3^{rd}$ Generation Partnership Project; Technical Specification Group Services and System Aspects; System Architecture for the 5G System; Stage 2 (Release 16) (Apr. 2019) 317 pages.

3GPP TR 23.734 V16.1.0, $3^{rd}$ Generation Partnership Object; Technical Specification Group Services and System Aspects; Study on Enhancement of 5G System (5GS) for Vertical and Local Area Network (LAN) Services (Release 16) (Mar. 2019) 111 pages.

3GPP TS 23.502 V16.0.2, $3^{rd}$ Generation Partnership Project; Technical Specification Group Services and System Aspects; Procedures for the 5G System; Stage 2 (Release 16) (Apr. 2019) 419 pages.

Media Access Control (MAC) Bridges, IEEE Standard 802.1D (2004) 281 pages, Best Available Date: Jun. 9, 2004.

International Search Report and Written Opinion for Patent Cooperation Treaty Application No. PCT/EP2020/061161 dated Jun. 8, 2020, 11 pages.

Ericsson, "Mapping of Bridge Port and QoS Control in 5GS", 3GPP TSG-SA WG2 Meeting #131, S2-1901721, (Feb. 25-Mar. 1, 2019), 7 pages.

Office Action for Indian Application No. 202147055360 dated Apr. 27, 2022, 7 pages.

\* cited by examiner

METHOD AND APPARATUS FOR PORT MANAGEMENT OF ETHERNET BRIDGES

CROSS-REFERENCE TO RELATED APPLICATIONS

This application claims priority to, and the benefit of, U.S. Provisional Patent Application Ser. No. 62/842,927, filed May 3, 2019 and titled "Method and Apparatus for Port Management of Ethernet Bridges," the entire disclosures of which are hereby incorporated herein by reference in their entireties for all purposes.

TECHNICAL FIELD

An example embodiment of the present disclosure generally relates to an apparatus, a method, and a computer program product related to transparent integration of a wireless network (e.g., a $3^{rd}$ Generation Partnership Project (3GPP) network) into a wireline network (e.g., a time sensitive networking (TSN) network).

BACKGROUND

Time sensitive networking (TSN) is being standardized by IEEE (Institute of Electrical and Electronics Engineers) 802.1 to provide industrial networks with deterministic delay to handle time sensitive traffic. Currently, wired links are assumed for connecting the sensors and controllers. Moving from wired to wireless sensors and actuators provides advantages, such as mobility, scalability, potentially lower maintenance costs, etc. To connect the wireless devices to a TSN network, wireless transmission mechanisms such as defined in 3GPP ($3^{rd}$ Generation Partnership Project) are necessary.

One consideration for TSN standardization is to have a centralized entity, named a CNC (Centralized Network Controller), which collects the requirements of end to end communication between Talker End Stations and Listener End Stations and performs scheduling centrally. Bridges receive connection information for their immediate network peer in each physical port using a link layer discovery protocol (LLDP).

In order to serve as a TSN bridge, a 3GPP $5^{th}$ generation system (5GS) needs to comply with standardized procedures and management protocols defined between the CNC and the bridge. A 5GS bridge needs to maintain a set of bridge managed objects (BMOs) that the CNC can use in order to read necessary information about a bridge as well as to accordingly configure the bridge. Gathering the information on the network topology and the network status is one of the fundamental procedures that need to be supported by the 5GS bridge. A prerequisite for supporting this procedure is collecting the information on the existing interfaces, e.g., ports of the 5GS bridge. This information needs to be maintained in the form of bridge managed objects, which describe the bridge interfaces. Any change in the bridge managed object, e.g., status of bridge ports, needs to be signaled to the CNC such that potential bridge re-configurations can be made. Due to the volatile nature of 5GS, especially due to the radio access network (RAN) conditions and user equipment mobility, the status of packet data unit (PDU) sessions and therefore the status of the 5GS bridge ports may change more often than in Ethernet-based fixed network implementations. Currently, the 3GPP 5GS and corresponding 5GS bridge specifications do not address the issue of maintenance of bridge managed objects that describe bridge interfaces, e.g., bridge ports.

BRIEF SUMMARY

A method, apparatus and computer program product are provided in accordance with an example embodiment to provide management of interfaces of Ethernet bridges.

In one example embodiment, a method is provided that includes receiving, at a networking translator, a notification trigger related to a protocol data unit session from a networking translator client or a network function of a communication network. The method further includes causing transmission, at the networking translator, of notification information to a network controller of the communication network according to an interface.

In some implementations of such a method, the network function is one of a session management function, policy control function or a user plane function. In some embodiments, the networking translator is configured to: cause transmission, at a networking translator client of the communication network, of a trigger for a user equipment to register for the communication network to the user equipment; receive, at the networking translator client, a registration response from the user equipment; cause transmission, at the networking translator client, of a trigger for the user equipment to request protocol data unit session establishment to the user equipment; receive, at the networking translator client, a protocol data unit session establishment accept; and cause transmission of information about the protocol data unit session establishment accept to a networking translator.

In some embodiments, the networking translator client is configured to: cause transmission, at a networking translator client of the communication network, for a trigger to request for the communication network to release a protocol data unit session associated with a user equipment; receive, at the networking translator client, an indication of a protocol data unit session release response; and cause transmission of information about the protocol data unit session release to a networking translator. In some embodiments, a request to release a protocol data unit session associated with the user equipment associated with the trigger may be transmitted by one or more of: the user equipment or a network function configured to transmit the trigger.

In some embodiments, the interface is defined by at least an object type that comprises one or more entries representing one or more user equipment ports or one or more User Plane Function (UPF) ports. A status of the interface is derived by status of one or more data unit sessions associated with the interface. The one or more data unit sessions may be associated with the one or more user equipment ports or the one or more UPF ports, or each pair of the one or more user equipment ports and the one or more UPF ports.

In some embodiments, the notification information comprises one or more of: an object representing a desired state of the interface or an object representing a current operational state of the interface. In some embodiments, the notification trigger is received from the network function and associated with the protocol data unit session release response.

In another embodiments, an apparatus comprising processing circuitry and at least one memory including computer program code for one or more programs is provided, the at least one memory and the computer program code configured to, with the processing circuitry, cause the apparatus at least to: receive, at a networking translator, a notification trigger related to a protocol data unit session from a networking translator client or a network function of a communication network; and cause transmission, at the networking translator, of notification information to a network controller of the communication network according to an interface.

In some implementations of such an apparatus, the network function is one of a session management function, policy control function or a user plane function. In some embodiments, the networking translator is configured to: cause transmission, at a networking translator client of the communication network, of a trigger for a user equipment to register for the communication network to the user equipment; receive, at the networking translator client, a registration response from the user equipment; cause transmission, at the networking translator client, of a trigger for the user equipment to request protocol data unit session establishment to the user equipment; receive, at the networking translator client, a protocol data unit session establishment accept; and cause transmission of information about the protocol data unit session establishment accept to a networking translator.

In some embodiments, the networking translator client is configured to: cause transmission, at a networking translator client of the communication network, for a trigger to request for the communication network to release a protocol data unit session associated with a user equipment; receive, at the networking translator client, an indication of a protocol data unit session release response; and cause transmission of information about the protocol data unit session release to a networking translator. In some embodiments, a request to release a protocol data unit session associated with the user equipment associated with the trigger may be transmitted by one or more of: the user equipment or a network function configured to transmit the trigger.

In some embodiments, the interface is defined by at least an object type that comprises one or more entries representing one or more user equipment ports or one or more User Plane Function (UPF) ports. A status of the interface is derived by status of one or more data unit sessions associated with the interface. The one or more data unit sessions may be associated with the one or more user equipment ports or the one or more UPF ports, or each pair of the one or more user equipment ports and the one or more UPF ports.

In some embodiments, the notification information comprises one or more of: an object representing a desired state of the interface or an object representing a current operational state of the interface. In some embodiments, the notification trigger is received from the network function and associated with the protocol data unit session release response.

In another embodiments, a computer program product is provided, the computer program product comprises at least one non-transitory computer-readable storage medium having computer executable program code instructions stored therein, the computer executable program code instructions comprising program code instructions configured, upon execution, to: receive, at a networking translator, a notification trigger related to a protocol data unit session from a networking translator client or a network function of a communication network; and cause transmission, at the networking translator, of notification information to a network controller of the communication network according to an interface.

In some implementations of such a computer program product, the network function is one of a session management function, policy control function or a user plane function. In some embodiments, the networking translator is configured to: cause transmission, at a networking translator client of the communication network, of a trigger for a user equipment to register for the communication network to the user equipment; receive, at the networking translator client, a registration response from the user equipment; cause transmission, at the networking translator client, of a trigger for the user equipment to request protocol data unit session establishment to the user equipment; receive, at the networking translator client, a protocol data unit session establishment accept; and cause transmission of information about the protocol data unit session establishment accept to a networking translator.

In some embodiments, the networking translator client is configured to: cause transmission, at a networking translator client of the communication network, for a trigger to request for the communication network to release a protocol data unit session associated with a user equipment; receive, at the networking translator client, an indication of a protocol data unit session release response; and cause transmission of information about the protocol data unit session release to a networking translator. In some embodiments, a request to release a protocol data unit session associated with the user equipment associated with the trigger may be transmitted by one or more of: the user equipment or a network function configured to transmit the trigger.

In some embodiments, the interface is defined by at least an object type that comprises one or more entries representing one or more user equipment ports or one or more User Plane Function (UPF) ports. A status of the interface is derived by status of one or more data unit sessions associated with the interface. The one or more data unit sessions may be associated with the one or more user equipment ports or the one or more UPF ports, or each pair of the one or more user equipment ports and the one or more UPF ports.

In some embodiments, the notification information comprises one or more of: an object representing a desired state of the interface or an object representing a current operational state of the interface. In some embodiments, the notification trigger is received from the network function and associated with the protocol data unit session release response.

In some embodiments, an apparatus is provided, the apparatus comprises means for receiving, at a networking translator, a notification trigger related to a protocol data unit session from a networking translator client or a network function of a communication network; and means for causing transmission, at the networking translator, of notification information to a network controller of the communication network according to an interface.

In some implementations of such an apparatus, the network function is one of a session management function, policy control function or a user plane function. In some embodiments, the networking translator is configured to: cause transmission, at a networking translator client of the communication network, of a trigger for a user equipment to register for the communication network to the user equipment; receive, at the networking translator client, a registration response from the user equipment; cause transmission, at the networking translator client, of a trigger for the user equipment to request protocol data unit session establishment to the user equipment; receive, at the networking translator client, a protocol data unit session establishment accept; and cause transmission of information about the protocol data unit session establishment accept to a networking translator.

In some embodiments, the networking translator client is configured to: cause transmission, at a networking translator client of the communication network, for a trigger to request for the communication network to release a protocol data unit session associated with a user equipment; receive, at the networking translator client, an indication of a protocol data unit session release response; and cause transmission of information about the protocol data unit session release to a networking translator. In some embodiments, a request to release a protocol data unit session associated with the user equipment associated with the trigger may be transmitted by one or more of: the user equipment or a network function configured to transmit the trigger.

In some embodiments, the interface is defined by at least an object type that comprises one or more entries representing one or more user equipment ports or one or more User Plane Function (UPF) ports. A status of the interface is derived by status of one or more data unit sessions associated with the interface. The one or more data unit sessions may be associated with the one or more user equipment ports or the one or more UPF ports, or each pair of the one or more user equipment ports and the one or more UPF ports.

In some embodiments, the notification information comprises one or more of: an object representing a desired state of the interface or an object representing a current operational state of the interface. In some embodiments, the notification trigger is received from the network function and associated with the protocol data unit session release response.

BRIEF DESCRIPTION OF THE DRAWINGS

Figure 1:
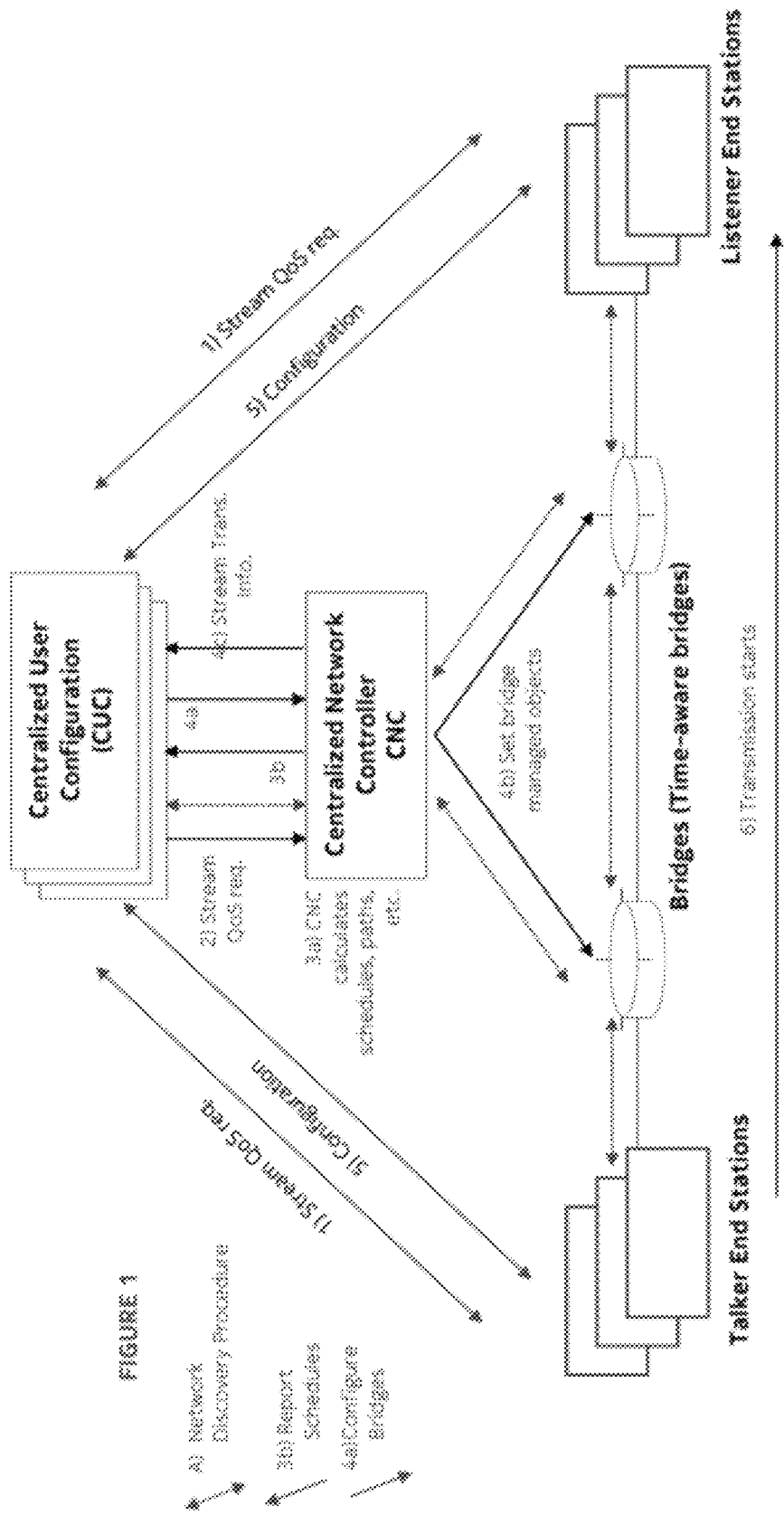
Figure 2:
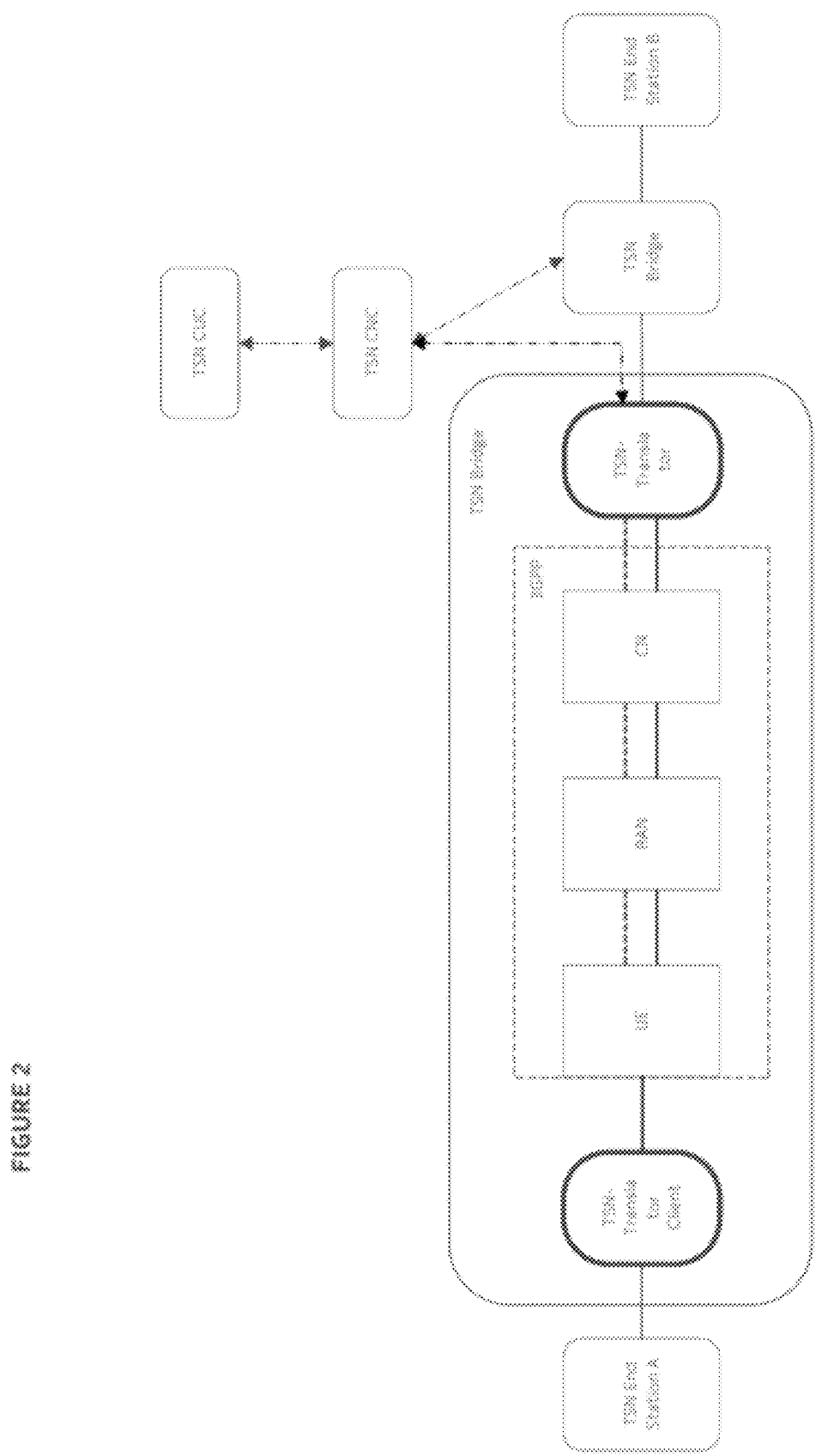
Figure 3:
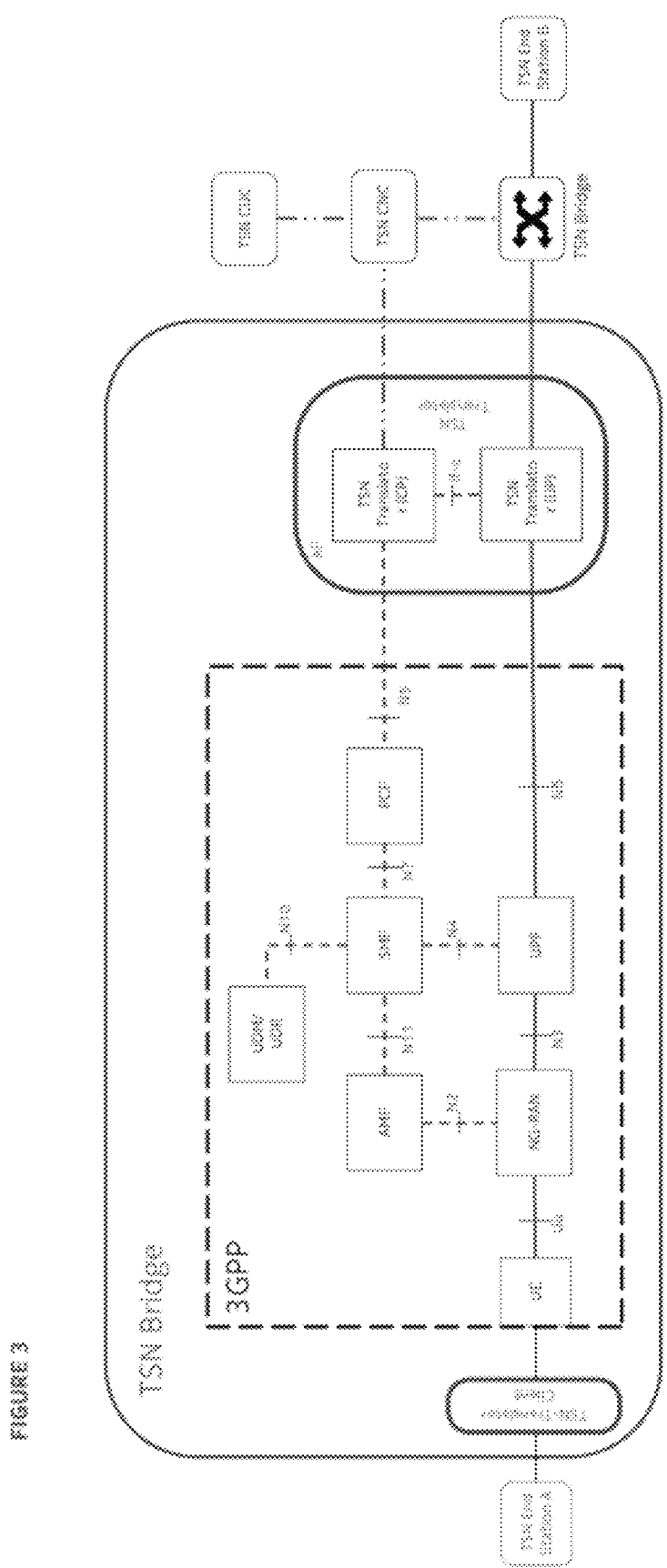
Figure 4:
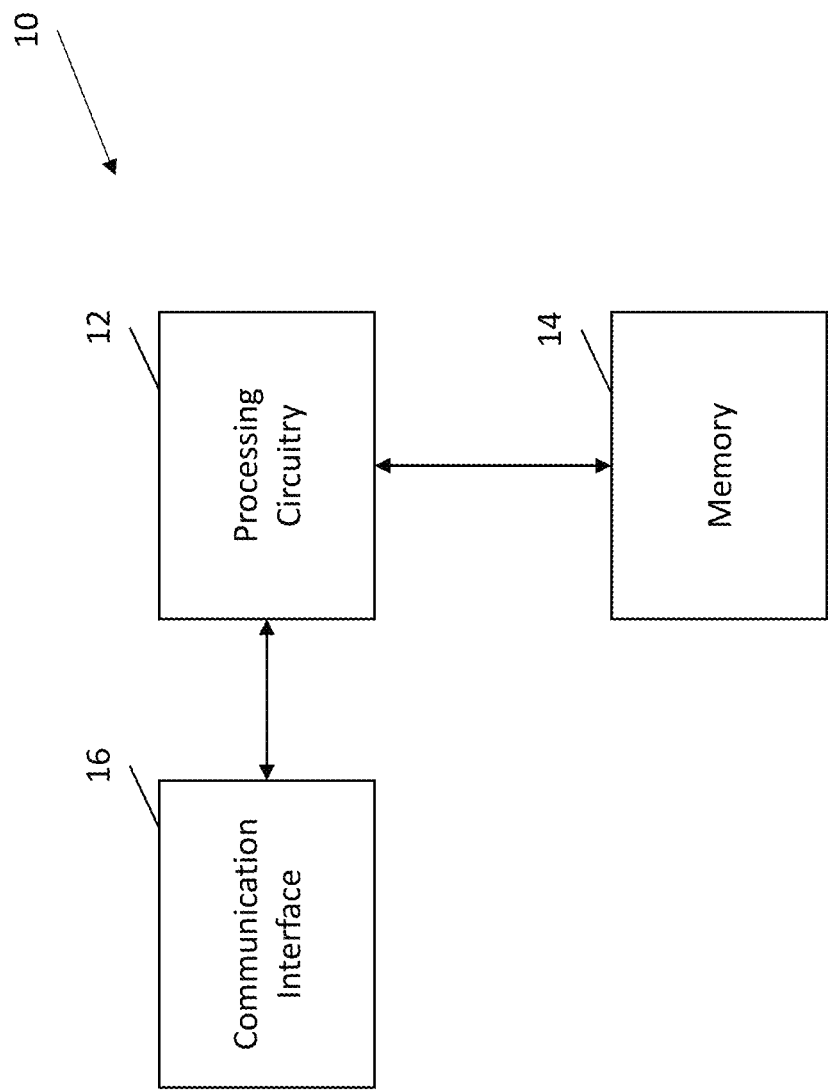
Figure 5:
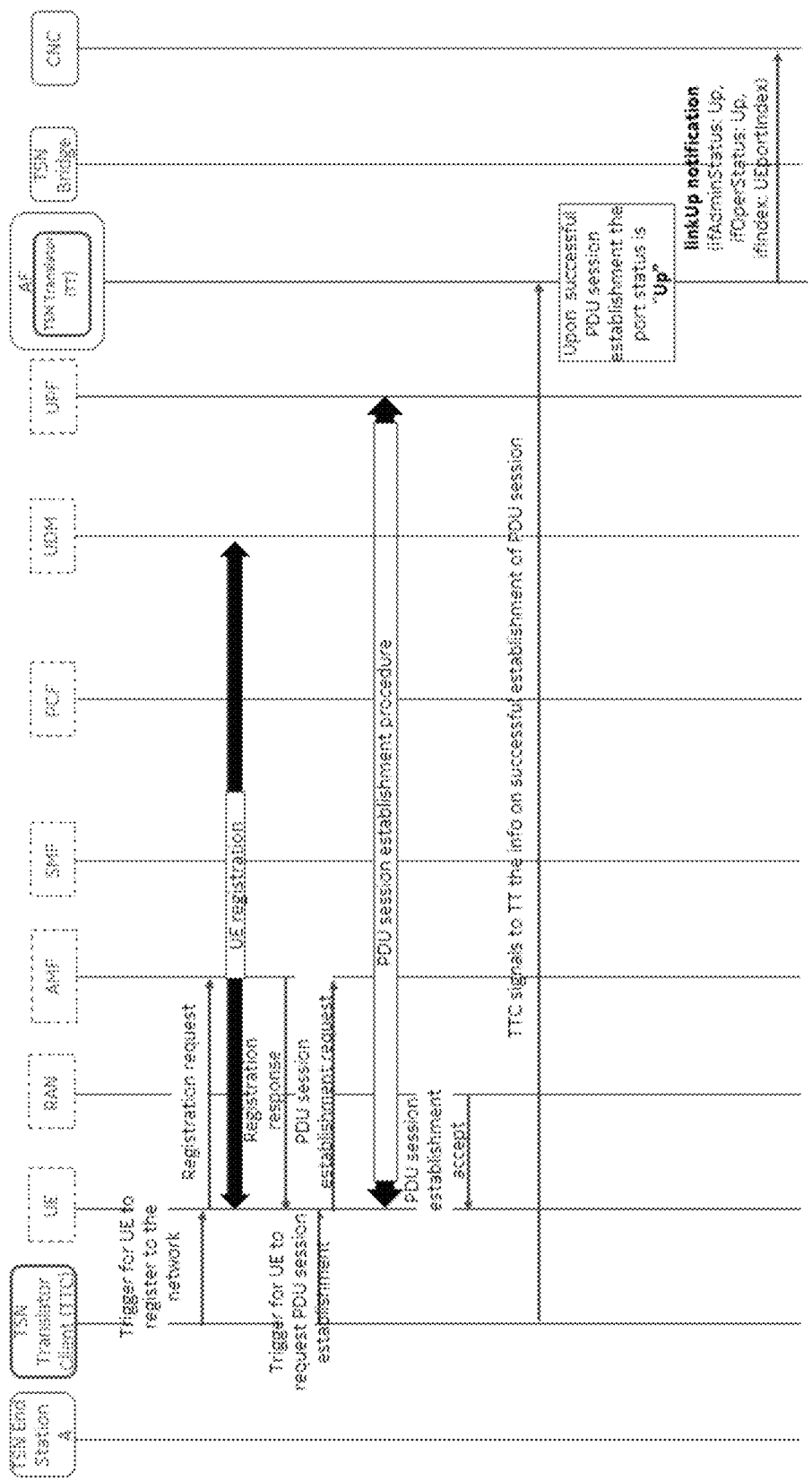
Figure 6:
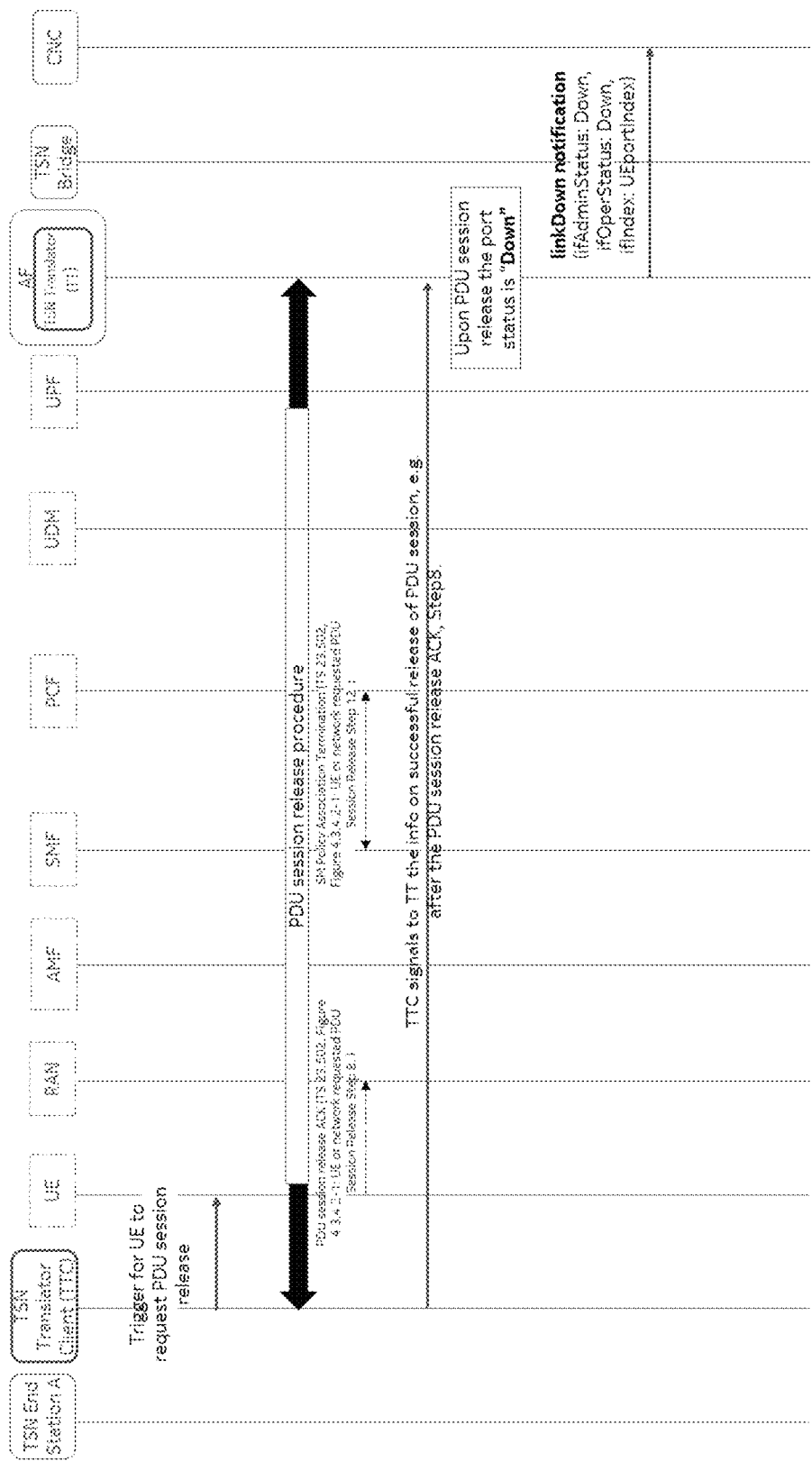
Figure 7:
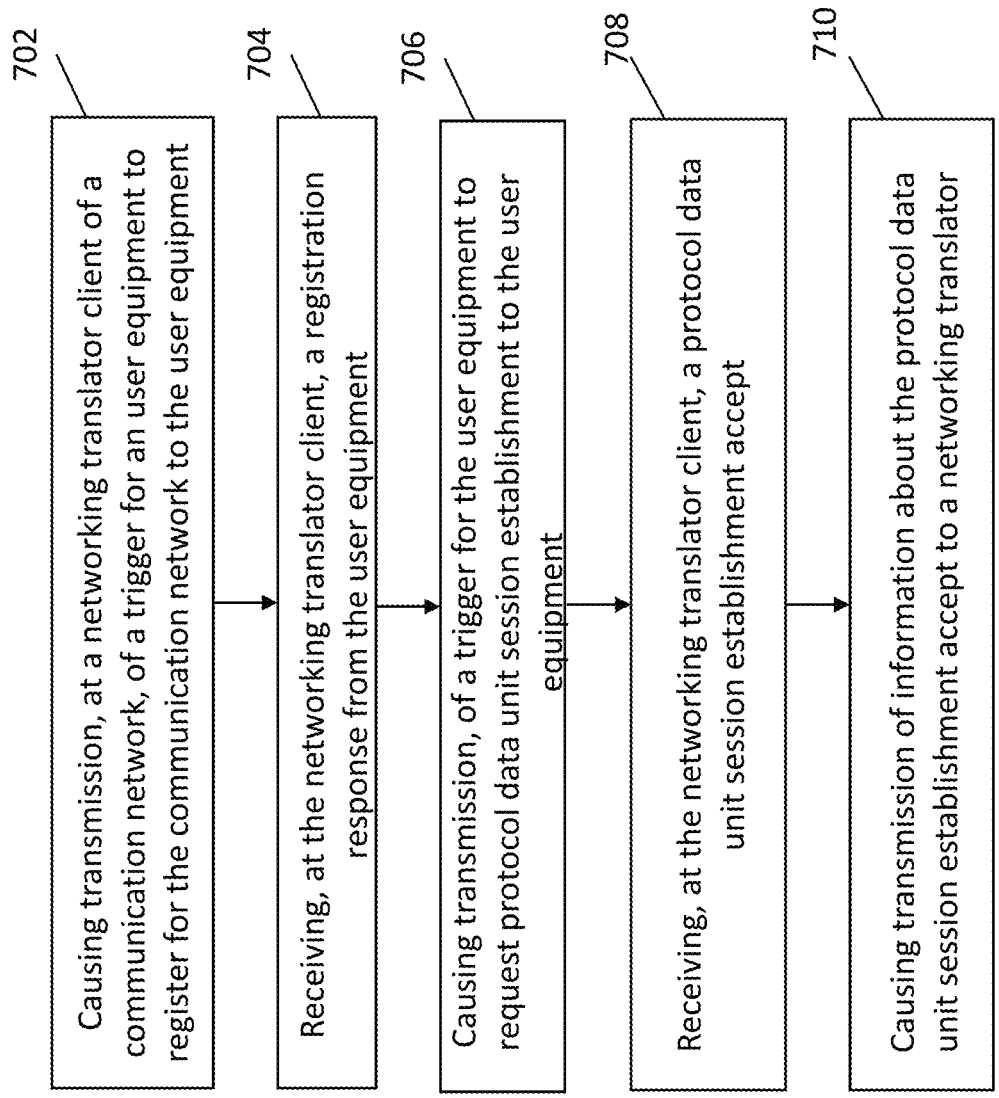
Figure 8:
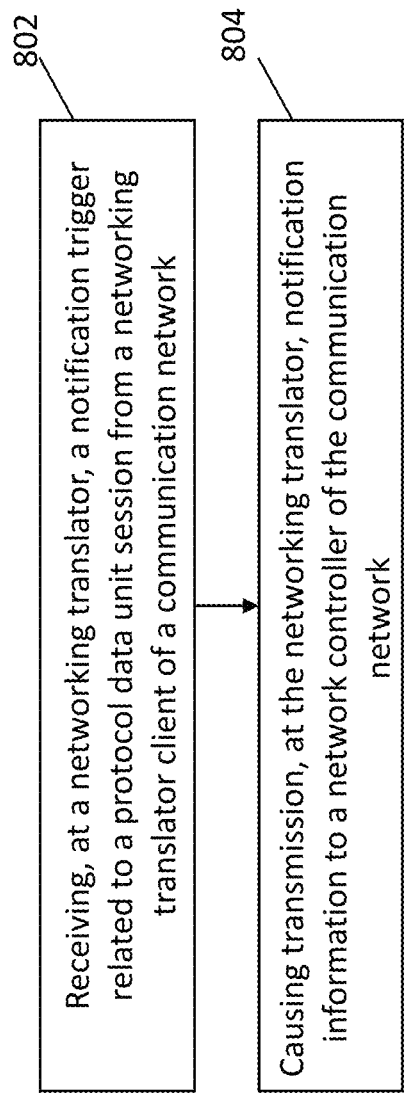
Figure 9:
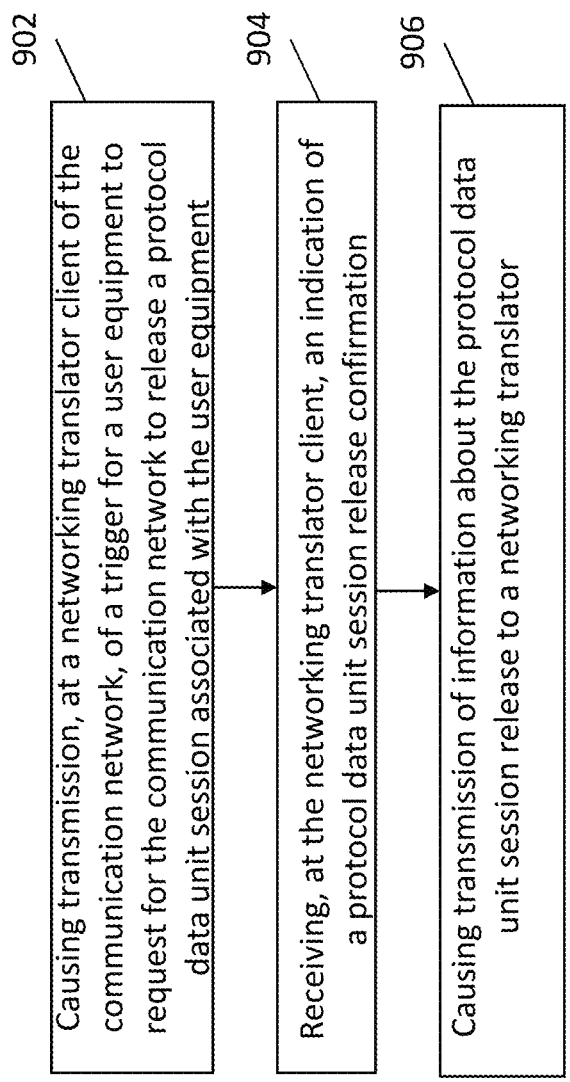

Having thus described certain example embodiments of the present disclosure in general terms, reference will hereinafter be made to the accompanying drawings, which are not necessarily drawn to scale, and wherein:

FIG. 1 shows a functional diagram of a TSN network including a flow of commands;

FIG. 2 shows a functional and simplified diagram of a TSN network according to an embodiment of the invention using a wireless communication service based on 3GPP;

FIG. 3 shows an example implementation of a 3GPP network integrated into a TSN network according to an embodiment of the invention;

FIG. 4 is a block diagram of an apparatus that may be specifically configured in accordance with an example embodiment of the present disclosure;

FIG. 5 is an example flow diagram for changing port status and updating bridge managed objects in accordance with an example embodiment of the present disclosure;

FIG. 6 is another example flow diagram for changing port status in accordance with an example embodiment of the present disclosure; and FIGS. 7 to 9 are flowcharts illustrating a set of operations performed, such as by the apparatus of FIG. 4, in accordance with an example embodiment of the present disclosure.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

Time sensitive networking (TSN) is being standardized by IEEE (Institute of Electrical and Electronics Engineers) 802.1 to provide industrial networks with deterministic delay to handle time sensitive traffic. Currently, wired links are assumed for connecting the sensors and controllers. Moving from wired to wireless sensors and actuators provides advantages, such as mobility, scalability, potentially lower maintenance costs, etc. To connect the wireless devices to a TSN network, wireless transmission mechanisms such as defined in 3GPP ($3^{rd}$ Generation Partnership Project) are necessary.

FIG. 1 shows numerous entities in a TSN. One of the key consideration for TSN standardization is to have a centralized entity, named the CNC (Centralized Network Controller), which collects the requirements of end to end communication between the Talker End Stations and Listener End Stations and performs scheduling centrally. The bridges learn the connection information for their immediate network peer in each physical port using, for instance, the link layer discovery protocol (LLDP). Each TSN network has a single CNC. In addition, there might be multiple centralized user configurators (CUCs) which translate the requirements of the end to end communication and communicate the translated requirements to the CNC. Furthermore, the CUC is responsible for configuring the respective Talker and Listener End Stations with transmission parameters computed by the CNC during the scheduling process. The solid arrows in FIG. 1 describe the main operations 1-6 involved in establishing a communication between a Talker and a Listener End Station.

Namely, in 1), CUC obtains the stream Quality of Service (QoS) from the end stations. Then, in 2) CUC provides the stream QoS requirements to the CNC. In 3a) the CNC calculates schedules, paths, etc. in order to fulfil the stream QoS requirements, which are reported to the CUC in 3b). In 4b, the CNC sets the managed objects of the bridges accordingly. The CNC informs, in 4c), the CUC about Stream Transmission (Trans) Info which contains the configuration parameters that the Talker End Station needs to use, including the destination media access control (MAC) address, the Virtual Local Area Network (VLAN) ID and the Priority Code Point (PCP) field. Configuration parameters may also include the transmit time window in which the Talker End Station may transmit and the receive time window in which the Listener End Station may expect to receive the packets.

In 5) the CUC configures the end stations accordingly. In parallel, as shown by dashed lines in FIG. 1, network discovery procedures run between related entities (e.g., between neighboured bridges, between each bridge and the CNC, between the CNC and the CUC, and between each station and the respective bridge to which the bridge is connected). After 5), in 6), transmission between Talker End Stations and Listener End Stations may be performed.

Note that the bridges are time-aware in a TSN network. There may be one or more bridges between a Talker End Station and a respective Listener End Station. In FIG. 1, two bridges are shown as an example. Each Talker End Station may talk to one or more Listener End Stations, and each Listener End Station may listen to one or more Talker End Stations. A Listener End Station of one communication may be a Talker End Station of another communication.

Currently, TSN is used as a mechanism to provide end to end connectivity with deterministic capacity and delay. The talkers (e.g., sensors, controllers) and listeners (e.g. controllers, actuators) may be connected through bridges using cables or other wiring.

FIG. 2 shows the general concept of the TSN Translator and its TSN Translator Client and how the TSN End Station A is connected to the TSN network via a wireless connection service provided by the 3GPP network. FIG. 2 corresponds to FIG. 1, but one of the bridges is replaced by the 3GPP network embedded between the TSN translator and the TSN translator client.

In FIG. 2, the entities of the TSN network are shown by round edged boxes and those of the 3GPP network are shown by sharp edged boxes. The user equipment (UE), the RAN and the core network (CN) together constitute the 3GPP network which is enclosed within a dashed line box. The solid lines connecting the entities represent the data plane and the dotted lines represent the control plane. The TSN translator and the TSN translator client shown by bold rounded boxes enable the transparent integration of the TSN network and the 3GPP network. The round edged box consisting of the TSN translator, the TSN translator client, and the 3GPP network constitute the logical TSN bridge formed on top of the 3GPP network. For simplicity, the communication paths of the TSN CUC with the TSN End Stations A and B are not shown in FIG. 2.

The TSN End Station A is connected to a UE via the TSN Translator Client. The UE is responsible to establish and handle the wireless connection service for the TSN End station A. The wireless connection service contains not only the wireless link between the UE and the RAN, but also essential CN services to provide for example authentication, mobility, QoS, etc.

For the transparent usage of the wireless connection service and to hide specific behavior of the 3GPP network to the TSN network and vice versa, a TSN translator function is introduced in some embodiments, which works as an intermediator between both domains, e.g., the TSN translator function understands the TSN protocol and maps the TSN CUC and TSN CNC messages as well as the TSN network messages into control and user plane messages of the 3GPP network to trigger corresponding actions in the 3GPP network, e.g., to trigger the establishment of a wireless connection with guaranteed QoS, and vice versa. Furthermore, the TSN translator function takes care of services like the enforcement of the priority classes for the traffic, frame translation, time gating, or the like, which are typically offered by the bridges in the wired network to guarantee deterministic communication. With respect to this view, the TSN Translator and the TSN Translator client are placed on both sides of the 3GPP network, namely, both the UE side and the CN side.

The TSN Translator and the TSN Translator Client are logically part of the same translation between the 3GPP and TSN networks and hence, it is beneficial that the TSN Translator and the TSN Translator Client do not act independently. Treating them as one entity allows the TSN Translator to be hidden on the UE side to the TSN network and to use the TSN Translator on the CN side to represent the complete 3GPP network as a TSN bridge to the TSN Network. This treatment simplifies especially the configuration and handling at the TSN CNC and the respective TSN CUCs. The TSN translator performs the major part of the translation of the TSN protocols to 3GPP commands and procedures and vice versa. The TSN Translator client on the UE side acts on behalf of the TSN Translator on the CN side and is therefore called the TSN Translator Client.

The integration of the TSN Translator with the TSN network may be done by implementing the protocols for a TSN bridge, the TSN ethernet protocol to exchange messages between a TSN bridge and another TSN ethernet bridge or TSN End Station B (user plane traffic, also called data traffic) and the protocol to exchange information with the TSN CNC (control plane). Additionally, the respective communication of the TSN End Station A with the TSN CUC is also handled via the TSN Translator and its TSN Translator Client.

FIG. 3 shows an example implementation for integrating a TSN network with a 3GPP network. The entities in the 3GPP network, shown within the dashed box labelled 3GPP, are possible functional entities resulting from the 3GPP release 15 standardization. This example could be mapped to other 3GPP releases or non-3GPP wireless networks. The TSN End Stations A and B could be a sensor, controller, actuator or any other industrial device. In the embodiment of FIG. 3, the UE is shown as a separate entity, however, the UE could be either integrated in the End Station A or could be plugged in or otherwise connected to the TSN End Station. Similarly, the TSN Translator Client could also be an integrated part of TSN End Station A, UE, or both.

As illustrated in FIG. 3, the TSN Translator and its TSN Translator Client work as an intermediator between both domains, e.g., the TSN Translator and its TSN Translator Client understand the TSN protocol and the 3GPP protocols and maps the TSN commands and messages into corresponding actions and messages in a 3GPP network providing 5G services and vice versa.

3GPP network interfaces may provide a set of functions which are defined for a specific 3GPP release. Therefore, the TSN Translator as well as the TSN Translator Client are designed to adapt to respective new releases. As long as a 3GPP release is not closed, 3GPP may introduce additional interfaces or adaptations to interfaces or even new functional entities which allows for, for example, optimizing or simplifying respective handling of the communication for TSN networks. An example for such an adaptation is the introduction of the new PDU session type "Ethernet" to handle ethernet traffic. The TSN Translator as well as the TSN Translator Client hide the release specifications to the TSN network. The same is valid for the 3GPP network when the TSN network introduces new functions and interface modifications.

In order to serve as a bridge, the 5GS needs to support a set of basic bridge managed objects which are essential for bridge management in TSN. One of the fundamental requirements in this regard is maintaining the bridge managed objects for providing the information about interface status such as the status of 5GS bridge ports.

For this purpose, Request For Comments (RFC) 2863 ("The Interfaces Group MIB") provided by the Internet Engineering Task Forces (IETF) defines a Management Information Base (MIB) to manage network interfaces, in particular the network interfaces of bridges. The following objects from RFC 2863 may be utilized for certain embodiments of the present disclosure:

ifNumber: "The number of network interfaces (regardless of their current state) present on this system."

ifTableLastChange: "The value of sysUpTime at the time of the last creation or deletion of an entry in the ifTable. If the number of entries has been unchanged since the last re-initialization of the local network management subsystem, then this object contains a zero value."

ifTable: "A list of interface entries. The number of entries is given by the value of ifNumber."

ifIndex: "A unique value, greater than zero, for each interface. It is recommended that values are assigned contiguously starting from 1. The value for each interface sub-layer must remain constant at least from one re-initialization of the entity's network management system to the next reinitialization."

ifDescr: "A textual string containing information about the interface. This string may include the name of the manufacturer, the product name and the version of the interface hardware/software."

ifType: "The type of interface. Additional values for ifType are assigned by the Internet Assigned Numbers Authority (IANA), through updating the syntax of the IANAifType textual convention."

ifMTU: "The size of the largest packet which can be sent/received on the interface, specified in octets. For interfaces that are used for transmitting network datagrams, this is the size of the largest network datagram that can be sent on the interface."

ifSpeed: "An estimate of the interface's current bandwidth in bits per second. For interfaces which do not vary in bandwidth or for those where no accurate estimation can be made, this object may contain the nominal bandwidth. If the bandwidth of the interface is greater than the maximum value reportable by this object then this object may report its maximum value (4,294,967,295) and ifHighSpeed must be used to report the interace's speed. For a sub-layer which has no concept of bandwidth, this object may be zero."

ifPhysAddress: The interface's address at its protocol sub-layer. For example, for an 802.x interface, this object normally contains a media access control (MAC) address. The interface's media-specific Management Information Base (MIB) must define the bit and byte ordering and the format of the value of this object. For interfaces which do not have such an address (e.g., a serial line), this object may contain an octet string of zero length.

ifAdminStatus: "The desired state of the interface. The testing(3) state indicates that no operational packets can be passed. When a managed system initializes, all interfaces start with ifAdminStatus in the down(2) state. As a result of either explicit management action or per configuration information retained by the managed system, ifAdminStatus is then changed to either the up(1) or testing(3) states (or remains in the down(2) state)."

ifOperStatus: "The current operational state of the interface. The testing(3) state indicates that no operational packets can be passed. If ifAdminStatus is down(2) then ifOperStatus may be down(2). If ifAdminStatus is changed to up(1) then ifOperStatus may change to up(1) if the interface is ready to transmit and receive network traffic; it may change to dormant(5) if the interface is waiting for external actions (such as a serial line waiting for an incoming connection); it may remain in the down(2) state if and only if there is a fault that prevents it from going to the up(1) state; it may remain in the notPresent(6) state if the interface has missing (typically, hardware) components."

ifLastChange: "The value of sysUpTime at the time the interface entered its current operational state. If the current state was entered prior to the last re-initialization of the local network management subsystem, then this object contains a zero value."

ifSpecific: "A reference to MIB definitions specific to the particular media being used to realize the interface. It is recommended that this value point to an instance of a MIB object in the media-specific MIB, e.g., that this object have the semantics associated with the InstancePointer textual convention defined in RFC 2579. In fact, it is recommended that the media-specific MIB specify what value ifSpecific may/can take for values of ifType. If no MIB definitions specific to the particular media are available, the value may be set to the OBJECT IDENTIFIER {0 0}."

ifXTable: "A list of interface entries. The number of entries is given by the value of ifNumber. This table contains additional objects for the interface table."

ifName: "The textual name of the interface. The value of this object may be the name of the interface as assigned by the local device and may be suitable for use in commands entered at the device's 'console'. This might be a text name, such as 'le0' or a simple port number, such as '1', depending on the interface naming syntax of the device. If several entries in the ifTable together represent a single interface as named by the device, then each will have the same value of ifName. Note that for an agent which responds to Simple Network Management Protocol (SNMP) queries concerning an interface on some other (proxied) device, then the value of ifName for such an interface is the proxied device's local name for it.

ifCounterDiscontinuityTime: "The value of sysUpTime on the most recent occasion at which any one or more of this interface's counters suffered a discontinuity. The relevant counters are the specific instances associated with this interface of any Counter32 or Counter64 object contained in the ifTable or ifXTable. If no such discontinuities have occurred since the last reinitialization of the local management subsystem, then this object contains a zero value."

ifStackTable: "The table containing information on the relationships between the multiple sub-layers of network interfaces. In particular, it contains information on which sub-layers run 'on top of' which other sub-layers, where each sub-layer corresponds to a conceptual row in the ifTable. [ . . . ]"

ifStackHigherLayer: "The value of ifIndex corresponding to the higher sub-layer of the relationship, i.e., the sub-layer which runs on 'top' of the sub-layer identified by the corresponding instance of ifStackLowerLayer. If there is no higher sub-layer (below the internetwork layer), then this object has the value 0."

ifStackLowerLayer: "The value of ifIndex corresponding to the lower sub-layer of the relationship, i.e., the sub-layer which runs 'below' the sub-layer identified by the corresponding instance of ifStackHigherLayer. If there is no lower sub-layer, then this object has the value 0."

ifStackStatus: "The status of the relationship between two sub-layers. [ . . . ]"

ifStackLastChange: "The value of sysUpTime at the time of the last change of the (whole) interface stack. A change of the interface stack is defined to be any creation, deletion, or change in value of any instance of ifStackStatus. If the interface stack has been unchanged since the last re-initialization of the local network management subsystem, then this object contains a zero value."

linkDown {ifIndex, ifAdminStatus, ifOperStatus}: "A linkDown trap signifies that the SNMP entity, acting in an agent role, has detected that the ifOperStatus object for one of its communication links is about to enter the down state from some other state (but not from the notPresent state). This other state is indicated by the included value of ifOperStatus."

linkup {ifIndex, ifAdminStatus, ifOperStatus}: "A linkUp trap signifies that the SNMP entity, acting in an agent role, has detected that the ifOperStatus object for one of its communication links left the down state and transitioned into some other state (but not into the notPresent state). This other state is indicated by the included value of ifOperStatus."

Currently, 3GPP procedures do not define the means for signaling the information about port status and maintaining the corresponding bridge managed objects. A method, apparatus and computer program product are provided in accordance with an example embodiment to provide management of interfaces of Ethernet bridges.

FIG. 4 illustrates an example apparatus that may be provided to embody the various components in a communication system, for example, a TSN end station, a TSN bridge, a TSN translator client (TTC), various components of the 5 GS, or the like. As illustrated in FIG. 4, the apparatus 10 of an example embodiment includes, is associated with or is otherwise in communication with processing circuitry 12, a memory 14, and a communication interface 16.

The processing circuitry 12 (and/or co-processors or any other circuitry assisting or otherwise associated with the processor) may be in communication with the memory device 14 via a bus for passing information among components of the apparatus 10. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 10 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processing circuitry 12 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processor may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 12 may be configured to execute instructions stored in the memory device 14 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processing circuitry to perform the algorithms and/or operations described herein when the instructions are executed. However, in some cases, the processing circuitry may be a processor of a specific device (e.g., an image processing system) configured to employ an embodiment of the present disclosure by further configuration of the processor by instructions for performing the algorithms and/or operations described herein. The processing circuitry may include, among other things, a clock, an arithmetic logic unit (ALU) and logic gates configured to support operation of the processor.

The communication interface 16 may be any means such as a device or circuitry embodied in either hardware or a combination of hardware and software that is configured to receive and/or transmit data from/to a network. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Bridge managed objects may be captured within MIBs which are standardized, e.g., by Internet Engineering Task Forces (IETF) or IEEE. Objects in the MIB are assigned an identifier which together with the object type identify a specific instantiation of the object.

The fundamental properties of the bridge are defined in the so called "Bridge-MIB". According to the IETF specification for the Bridge MIB it is assumed that a bridge implementing this MIB will also (at least) implement the MIB defining the interfaces, e.g., "Interfaces Group MIB". The "Interfaces Group MIB" is defined as being mandatory for all bridges as it contains information on bridge interfaces. The details of IF-MIB e.g., "The Interfaces Group MIB" (RFC 2863) that may be relevant for certain embodiments of the present disclosure were previously described.

Maintaining the correct information about bridge interfaces/ports is fundamental for efficient management. This information is not static, and the procedure of maintaining such information needs to allow for the dynamic addition/removal of network interfaces, which is of particular interest for a 5GS bridge where ports may be associated with different entities, e.g. a user plane function (UPF) and UE, which may change over time, for example by addition/removal of UEs and their mobility.

Each interface may have different status. ifAdminStatus may be the desired state of the interface (up, down, testing) and ifOperStatus may be the current operational state of the interface (up, down, testing, unknown, dormant, notPresent, lowerLayerDown). Such information is to be maintained by the 5GS bridge. The 5GS bridge may be designed in a way to support different binding of PDU sessions and offered ports, e.g., one option is to bind a PDU session to a UE port and a UPF port. In such a case, the status of the UE port will depend on the status of the corresponding PDU session within 5GS, and the status of a UPF port on the status of the corresponding PDU sessions. More specifically, if there is at least one established PDU session corresponding to a port, then the port status shall be "Up". Only if there is no established PDU session corresponding to a port, the port status shall be "Down". Such port status changes are maintained in IF-MIB and reported towards the TSN CNC (or a general network management system) regardless of the actual PDU session to port binding approach. In other words, the 5GS is able to report the changes in the port status by issuing LinkUp/linkDown notifications.

In some embodiments, the present disclosure defines or modifies the definition of standard interfaces (such as the interfaces defined in MIB/IF-MIB described above) in a way that information exposed about the bridge not only contains the information about ports corresponding to PDU Sessions, which have already been established, but also information about ports corresponding to PDU Sessions that may be established in the future. By way of example, the set of interfaces of the 3GPP Bridge may be defined in two different ways:

1. Each UE and User Plane Function (UPF) Port of the 3GPP Bridge is represented by one entry in the ifTable object. This would fully abstract the 3GPP Bridge and no information of the 3GPP system itself needs to be or will be exposed.

2. Each UE Port of the 3GPP Bridge is presented by a stacked port with a 3GPP specific lower interface and an Ethernet specific higher interface. This approach would allow for defining 3GPP specific objects and assigning object values directly for the 3GPP specific interfaces, for which the higher layer Ethernet interface is managed in a conventional manner. A UPF port may be represented by one entry in the ifTable object.

In the case that a change of the ifTable occurs, e.g., adding or removing entries corresponding to PDU Sessions within the 3GPP System, the ifTableLastChange would have to be changed properly. The time set for ifTableLastChange may be the common time used by the 3GPP system and correspond to the time when the PDU Session has been successfully released/established.

The individual object values of an ifTable entry (ifEntry) of the IF-MIB may be determined as follows:

ifIndex: The object's value must be persistent within the 3GPP bridge, e.g., even if the UE would deregister and register again with the same 3GPP mobile network, the ifIndex must be maintained. In order to achieve this, the following options are possible:

After deregistering the UE, the entry in ifTable is maintained and only the corresponding ifOperStatus and ifAdminStatus are updated (the state will be updated to "notPresent" or "Down"see below for more details). After the UE registers again this will imply creation of a new entry in ifTable. This may lead to a very large ifTable (such that it may be preferable to remove those entries).

After deregistering the UE, the ifEntry is stored in the 3GPP Unified Data Management (UDM) in order to maintain the state (and potentially the ifIndex). After registering again, the UE's state (corresponding ifEntry) would be restored and properly included in the ifTable. This requires that before adding a corresponding entry in the ifTable, the corresponding UDM information has to be used to determine a ifIndex object value, which has not been assigned yet. Note that in the case of registering again a UE to the 3GPP mobile network, the object ifCounterDiscontinuityTime of the ifXTable object may need to be updated, in the case that counters are reset.

ifType:
In the case that the above described stacked approach is chosen, for each Port corresponding to a PDU Session in the 5GS bridge (UE port, UPF port), two interfaces are set up. The lower layer interface may use an existing legacy IANAtype such Wwanpp or Wwanpp2, even though these have been defined for Global System for Mobile communications (GSM) and Code Division Multiple Access (CDMA), respectively. Alternatively, a proper 5G specific Wwanpp5G may be defined. The higher layer interface is of a type ethernetCsmacd.

In the case that the above described stacked approach is not chosen, the IANAtype ethernetCsmacd is chosen for the port in order to avoid revealing specific 3GPP 5GS information.

ifMTU: This value may capture the maximum burst size applied for the PDU Session corresponding to the respective interface. For the ifMTU of the Port representing the UPF port, the maximum of all associated (by means of according PDU sessions) UE ports may be assigned. If the above described stacked approach is applied, the ifMTU of a lower layer 3GPP interface is chosen according to the maximum data burst size while the ifMTU of the higher layer Ethernet interface is chosen either using the same value or a different value.

ifSpeed: This value is of particular importance, not only in a TSN bridge in general but for a 3GPP bridge specifically. In the case the above described stacked approach is chosen, the ifSpeed for the lower 3GPP interface may be chosen according to the maximum average throughput guaranteed by the QoS flows corresponding to the PDU session set up for this particular port. Apparently, for the UPF port, this would rather be the sum of all UE ports. The ifSpeed reported for the 3GPP interface must take into account radio access network and core network constraints, as well as uplink and downlink transmissions. The ifSpeed can also be reported before an actual PDU Session has been set up. In this case, it would represent the expected throughput towards the UE, the maximum throughput, or the minimum guaranteed throughput. The higher layer Ethernet interface may report the ifSpeed corresponding to the Ethernet technology applied. If the above described stacked approach is not chosen, the minimum of the 3GPP interface and the Ethernet interface may be reported.

ifDescr: The ifDescr may contain UE- or UPF-specific information in order to uniquely identify the device within the 3GPP network, e.g., Internet Protocol (IP) address, international mobile subscriber identity (IMSI), etc. It may also contain information about the 3GPP release applied, the UE's category, or other information. In a similar way, the object ifName of an entry in the object ifXTable may contain specific UE- or UPF-specific information such as IMSI or IP address.

ifPhysAddress: If the above described stacked approach is chosen, the ifPhysAddress of the 3GPP lower layer interface may be equivalent to a PDU session specific identifier within the 3GPP system (in the case of a UE port); and equivalent to the UPF's IP address in the case of a UPF port. The ifPhysAddress of the higher layer Ethernet interface would correspond to the MAC address of the port.

ifSpecific: This object may be utilized in the case of the above described stacked approach in order to point towards 3GPP specific Management Information Base, which may be defined specifically for the purpose and application to the 3GPP Bridge.

The two objects ifOperStatus and ifAdminStatus are of particular importance for the operation of the 3GPP Bridge and represent the bridge's dynamic changes. Additional details of these two objects in some embodiments are described below.

Based on the above described stacked approach, a corresponding ifStackTable would be defined with one entry for each port defined in the 3GPP bridge. The entry of corresponding port would list the Ethernet higher layer interface as ifStackHigherLayer and the 3GPP lower layer interface as ifStackLowerLayer. Corresponding to the Port-Up/Down operation described below, also the ifStackStatus needs to be updated properly in order to reflect the changes in the stack. In general, if a PDU session is released, the following options are possible.

Option 1. Only the lower layer 3GPP interface is down while the higher layer Ethernet interface is up. This would allow for directly identifying that the connection in the 3GPP system is affected.

Option 2. Both the 3GPP lower layer interface and Ethernet interface are down.

The TSN Translator (TT) and the TSN Translator Client (TTC) may be used to realize the bridge ports from the network side and the UE side, respectively. The TTC is in communication of the TT; provides required information to the TT and acts based on instructions from the TT. The control part of the TT would provide an interface towards the TSN CNC in order to translate the protocols/messages between the TSN and the 5GS. The TT maintains the bridge MIBs that are associated with the 5GS bridge. Therefore, the TT would maintain an IF-MIB in particular with respect to the status of the ports at the 5GS bridge, as this may facilitate efficient bridge management in some embodiments.

FIG. 5 is an example flow diagram for changing port status and updating bridge managed objects. As illustrated in FIG. 5, the UE port may be configured to have a status of "Up" once the according PDU session to the UPF is successfully established. After the status has changed to "Up", a corresponding notification linkUp with a new ifAdminStatus and ifOperStatus, as well as an ifIndex corresponding to the UE port, may be sent to the CNC.

FIG. 6 is another example flow diagram for changing port status. The UE port may be configured to change the status to "Down" once the corresponding PDU session is released. The PDU session release procedure is requested/initiated either by the network or UE side, e.g., by one of the following events/entities:

1. UE requested: The UE initiates the UE Requested PDU Session Release procedure
2. Policy Control Function (PCF) initiated: The PCF may invoke an SM Policy Association Termination procedure to request the release of the PDU Session.
3. Access and Mobility Management Function (AMF) initiated: may invoke the Nsmf_PDUSession_ReleaseSMContext service operation to request the release of the PDU Session
4. Session Management Function (SMF) initiated: based on a request from the Data Network (DN), UDM, based on the notification received from the AMF, based on a locally configured policy, or basedupon notification of the SMF by the (R)AN that the PDU session resource establishment has failed during a mobility procedure.

Upon the release of the PDU session the status of the corresponding UE port is changed to "Down". The trigger for changing the port status may be e.g., the step of SM Policy Association Termination, as described in 3GPP TS 23.502 (Step 12 FIG. 4.3.4.2-1: UE or network requested PDU Session Release for non-roaming and roaming with local breakout), or the PDU Session Release ACK sent from UE to the (R)AN (Step 8 FIG. 4.3.4.2-1: UE or network requested PDU Session Release for non-roaming and roaming with local breakout). In the latter case the TTC may inform the TT on the successful release of the PDU session, such that the corresponding port status can be changed, as illustrated in FIG. 6. Furthermore, the information on PDU session release finalization can be obtained either from SMF and PCF, or upon an exchange of "N4 PDU session release request" and "N4 PDU session release response" between the SMF and the UPF. The information regarding the PDU session release is then signaled towards the TT, which can appear as e.g. an Application Function (AF, e.g., as illustrated in FIG. 6) or be part of the Policy Control Function (PCF).

After the status has changed to "Down" a corresponding notification linkDown with the new ifAdminStatus and ifOperStatus, as well as the ifIndex corresponding to the UE port, is sent to the CNC.

Referring now to FIG. 7, the operations performed by a component of the communication system, such as a TSN translator client, a TSN translator, a bridge port, or the like, which may be embodied by the apparatus illustrated in FIG.

4 in accordance with an example embodiment are illustrated in the context of a bridge port by way of example, but not of limitation.

As shown in block 702, the bridge port, including, for example, a Time Sensitive Networking (TSN) translator client or a Device-side TSN translator, includes means, such as the communication interface 16 and/or the processing circuitry 12, for causing transmission, at a networking translator client of a communication network, of a trigger for a user equipment to register for the communication network. The networking translator client may be a TSN translator client previously described (which may be equivalent to a Device-side TSN translator).

As illustrated in FIG. 5, upon receiving the trigger, the user equipment may be configured to transmit a registration request to an AMF of the network. After completing the registration, the AMF may transmit a registration response back to the UE.

After block 702 and as shown in block 704, the bridge port includes means, such as the processing circuitry 12, for receiving, at the networking translator client, a registration response from the user equipment. As illustrated in FIG. 5, upon receiving the trigger, the user equipment may be configured to transmit a PDU session establishment request to the AMF. After establishing the PDU session, the AMF may optionally transmit an establishment response back to the UE.

After block 704 and as shown in block 706, the bridge port includes means, such as the processing circuitry 12, for causing transmission, at the networking translator client, of a trigger for the user equipment to request Protocol Data Unit (PDU) session establishment to the user equipment.

After block 706 and as shown in block 708, the bridge port includes means, such as the processing circuitry 12, for receiving, at the networking translator client, a PDU session establishment accept.

After block 708 and as shown in block 710, the bridge port includes means, such as the communication interface 16 and/or the processing circuitry 12, for causing transmission of information about the PDU session establishment accept to a TSN translator. The information about the PDU session establishment accept were previously described. In some embodiments, the TSN translator is configured to transmit notification information to a network controller, such as the Centralized Network Controller (CNC) previously described, of the communication network according to an interface, such as the modified IF-MIB interface previously described. In some embodiments, the interface is defined by one or more object types that comprises one or more entries representing one or more user equipment and User Plane Function (UPF) ports, such as the ifTable object. In some embodiments, the one or more entries further include entries representing one or more data unit sessions associated with each pair of the one or more user equipment and one or more UPF ports. In some embodiments, the interface is defined by at least an object type that comprises one or more entries representing one or more user equipment or one or more User Plane Function (UPF) ports. A status of the interface is derived by status of one or more data unit sessions associated with the interface; and the one or more data unit sessions may be associated with the one or more UPF ports or each pair of the one or more user equipment and one or more UPF ports. In some embodiments, the notification information comprises an object representing the desired state of the interface, such as the ifAdminStatus previously described. In some embodiments, the notification information comprises an object representing a current operational state of the interface, such as the ifOperStatus previously described.

Referring now to FIG. 8, the operations performed by a component of the communication system, such as a Network-side TSN translator, a TSN translator, a bridge port, or the like, which may be embodied by the apparatus illustrated in FIG. 4 in accordance with an example embodiment are illustrated in the context of a bridge port by way of example, but not of limitation.

As shown in block 802, the bridge port, including, for example, the TSN translator or the Network-side TSN translator, includes means, such as the communication interface 16 and/or the processing circuitry 12, for receiving, at a networking translator, a notification trigger related to a protocol data unit session from a networking translator client or a network function of a communication network. The networking translator may be a TSN translator previously described (which may be equivalent to a Network-side TSN translator). The notification trigger may be various triggers previously described in conjunction with FIGS. 5 to 7.

After 802, as shown in block 804, the bridge port, including, for example, a Time Sensitive Networking (TSN) translator or a Network-side TSN translator, includes means, such as the communication interface 16 and/or the processing circuitry 12, for causing transmission, at the networking translator, of notification information to a network controller of the communication network according to an interface. The notification information are previously described in conjunction with FIGS. 5 to 7. In some embodiments, the transmission may be completed according to the interface, such as the IF-MIB interface, previously described. In some embodiments, the interface is defined by one or more object types that comprises one or more entries representing one or more user equipment and User Plane Function (UPF) ports, such as the ifTable object. In some embodiments, the one or more entries further include entries representing one or more data unit sessions associated with each pair of the one or more user equipment and one or more UPF ports. In some embodiments, the notification information comprises an object representing the desired state of the interface, such as the ifAdminStatus previously described. In some embodiments, the notification information comprises an object representing a current operational state of the interface, such as the ifOperStatus previously described.

Referring now to FIG. 9, the operations performed by a component of the communication system, such as a bridge port, a Time Sensitive Networking (TSN) translator client or a Device-side TSN translator, which may be embodied by the apparatus illustrated in FIG. 4 in accordance with an example embodiment are illustrated in the context of a bridge port by way of example, but not of limitation.

As shown in block 902, the bridge port, including, for example, the TSN translator client or the Device-side TSN translator, includes means, such as the communication interface 16 and/or the processing circuitry 12, for causing transmission, at a networking translator client of the communication network, for a trigger to request for the communication network to release a protocol data unit session associated with a user equipment. A request to release a protocol data unit session associated with the user equipment associated with the trigger may be transmitted by one or more of: the user equipment or a network function configured to transmit the trigger, such as the PCF, the SMF, or the AMF. The networking translator client may be a TSN translator client previously described (which may be equivalent to a Device-side TSN translator). The trigger may be various triggers for PDU session release previously described in conjunction with FIG. 6.

After 902, as shown in block 904, the bridge port includes means, such as the communication interface 16 and/or the processing circuitry 12, for receiving, at the networking translator client, an indication of a protocol data unit session release response from the communication network. In some embodiments, the protocol data unit session release response may be first received by various network functions, such as the SMF and the PCF, then transmitted to the networking translator client in the form of information indicating the response. In some embodiments, the networking translator may receive information regarding the protocol data unit session release response directly from above mentioned various network functions, such as SMF and PCF.

After 904, as shown in block 906, the bridge port includes means, such as the communication interface 16 and/or the processing circuitry 12, for causing transmission of information about the protocol data unit session release to a networking translator. In some embodiments, the transmission may be completed according to the interface, such as the IF-MIB interface, previously described. In some embodiments, the interface is defined by one or more object types that comprises one or more entries representing one or more user equipment and User Plane Function (UPF) ports, such as the ifTable object. In some embodiments, the one or more entries further include entries representing one or more data unit sessions associated with each pair of the one or more user equipment and one or more UPF ports. In some embodiments, the notification information comprises an object representing the desired state of the interface, such as the ifAdminStatus previously described. In some embodiments, the notification information comprises an object representing a current operational state of the interface, such as the ifOperStatus previously described.

As described above, FIGS. 7 to 9 are flowcharts of an apparatus 10, method, and computer program product according to certain example embodiments. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present invention and executed by processing circuitry 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowcharts of FIGS. 7 to 9. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as represented by the blocks outlined in dashed lines. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A method comprising:
receiving, within an application function of a mobile communication system, from a network function of the mobile communication system, information regarding a status change of a protocol data unit session associated with the mobile communication system, the status change of the protocol data unit session being associated with a status change of a bridge port, the bridge port being associated with a time sensitive networking (TSN) bridge; and causing transmission, by the application function, towards a centralized network controller of a time sensitive network, of information regarding the status change of the bridge port, wherein the TSN bridge enables integration of the mobile communication system with the time sensitive network, wherein the bridge port comprises a device-side TSN translator at a user equipment side of the TSN bridge, the device-side TSN translator being associated with a user equipment of the mobile communication system.

2. The method of claim 1, wherein the status change of a protocol data unit session comprises a protocol data unit session establishment.

3. The method of claim 1, wherein the status change of a protocol data unit session comprises a protocol data unit session release.

4. The method of claim 1, further comprising:
receiving, from the network function of the mobile communication system, the information regarding a status change of a protocol data unit session status.

5. The method of claim 4, wherein the network function of the mobile communication system comprises a session management function.

6. The method of claim 4, wherein the network function of the mobile communication system comprises a policy control function.

7. An apparatus comprising:
at least one processor; and
at least one memory including computer program code, the at least one memory and the computer program code configured to, with the at least one processor, cause the apparatus at least to perform:
receiving, from a network function of a mobile communication system, information regarding a status change of a protocol data unit session associated with the mobile communication system, the status change of the protocol data unit session being associated with a status change of a bridge port, the bridge port being associated with a time sensitive networking (TSN) bridge; and
causing transmission, towards a centralized network controller of a time sensitive network, of information regarding the status change of the bridge port,
wherein the TSN bridge enables integration of the mobile communication system with the time sensitive network,
wherein the bridge port comprises a device-side TSN translator at a user equipment side of the TSN bridge, the device-side TSN translator being associated with a user equipment of the mobile communication system.

8. The apparatus of claim 7, wherein the status change of a protocol data unit session comprises a protocol data unit session establishment.

9. The apparatus of claim 7, wherein the status change of a protocol data unit session comprises a protocol data unit session release.

10. The apparatus of claim 7, wherein the at least one memory and the computer program code are further configured to, with the at least one processor, cause the apparatus at least to perform:

receiving, from the network function of the mobile communication system, the information regarding a status change of a protocol data unit.

11. The apparatus of claim 10, wherein the network function of the mobile communication system comprises a session management function.

12. The apparatus of claim 10, wherein the network function of the mobile communication system comprises a policy control function.

13. A non-transitory computer readable storage medium comprising program instructions for causing an apparatus to perform at least the following:
receiving, within an application function of a mobile communication system, from a network function of the mobile communication system, information regarding a status change of a protocol data unit session associated with the mobile communication system, the status change of the protocol data unit session being associated with a status change of a bridge port, the status change of the bridge port being associated with a time sensitive networking (TSN) bridge; and
causing transmission, by the application function, towards a centralized network controller of a time sensitive network, of information regarding the status change of the bridge port,
wherein the TSN bridge enables integration of the mobile communication system with the time sensitive network,
wherein the bridge port comprises a device-side TSN translator at a user equipment side of the TSN bridge, the device-side TSN translator being associated with a user equipment of the mobile communication system.

14. The non-transitory computer readable storage medium of claim 13, wherein the program instructions are further configured for causing the apparatus to perform at least the following:
receiving, via an application function of the mobile communication system, the information regarding the status change of a protocol data unit session; and
causing, vis an application function of the mobile communication system, the transmission of information regarding the status change of the bridge port.

15. The non-transitory computer readable storage medium of claim 13, wherein the status change of a protocol data unit session comprises a protocol data unit session establishment or a protocol data unit session release.

16. The non-transitory computer readable storage medium of claim 13, wherein the program instructions are further configured for causing the apparatus to perform at least the following:
receiving the information regarding a status change of a protocol data unit session from a network function of the mobile communication system,
wherein the network function of the mobile communication system comprises a session management function or a policy control function.

* * * * *